United States Patent
Yan et al.

(10) Patent No.: US 11,550,098 B2
(45) Date of Patent: Jan. 10, 2023

(54) LOW-DISPERSION SINGLE-MODE OPTICAL FIBER

(71) Applicant: YANGTZE OPTICAL FIBRE AND CABLE JOINT STOCK LIMITED COMPANY, Hubei (CN)

(72) Inventors: Changkun Yan, Hubei (CN); Wufeng Xiao, Hubei (CN); Runhan Wang, Hubei (CN); Tiejun Wang, Hubei (CN); Beibei Cao, Hubei (CN); Ming Cheng, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 0 days.

(21) Appl. No.: 17/420,291

(22) PCT Filed: Oct. 20, 2020

(86) PCT No.: PCT/CN2020/122056
§ 371 (c)(1),
(2) Date: Jul. 1, 2021

(87) PCT Pub. No.: WO2021/082978
PCT Pub. Date: May 6, 2021

(65) Prior Publication Data
US 2022/0050244 A1 Feb. 17, 2022

(30) Foreign Application Priority Data
Oct. 29, 2019 (CN) .......................... 201911039850.1

(51) Int. Cl.
*G02B 6/36* (2006.01)
*G02B 6/02* (2006.01)
*G02B 6/036* (2006.01)

(52) U.S. Cl.
CPC ...... *G02B 6/02214* (2013.01); *G02B 6/03644* (2013.01); *G02B 6/03666* (2013.01)

(58) Field of Classification Search
CPC ............ G02B 6/02214; G02B 6/03644; G02B 6/03666
See application file for complete search history.

(56) References Cited

U.S. PATENT DOCUMENTS 4,435,040 A * 3/1984 Cohen ................ G02B 6/02223
385/127
2004/0086243 A1 5/2004 DiGiovanni et al.
(Continued)

FOREIGN PATENT DOCUMENTS

| CN | 102200610 A | 9/2011 |
| CN | 103257397 A | 8/2013 |

(Continued)

OTHER PUBLICATIONS

State Intellectual Property Office of People's Republic of China, "International Search Report for PCT Application No. PCT/CN2020/122056", China, dated Jan. 19, 2021.

*Primary Examiner* — Eric Wong
(74) *Attorney, Agent, or Firm* — Tim Tingkang Xia, Esq.; Locke Lord LLP (57) ABSTRACT

A low-dispersion single-mode fiber includes a core and claddings covering the core. The core layer has a radius in a range of 3-5 μm and a relative refractive index difference in a range of 0.15% to 0.45%. The claddings comprise a first depressed cladding, a raised cladding, a second depressed cladding, and an outer cladding arranged sequentially from inside to outside. The first depressed cladding has a unilateral width in a range of 2-7 μm and a relative refractive index difference in a range of −0.4% to 0.03%. The raised cladding has a unilateral width in a range of 2-7 μm and a relative refractive index difference in a range of 0.05% to 0.20%.

(Continued)

The second depressed cladding has a unilateral width in a range of 0-8 μm and a relative refractive index difference in a range of 0% to −0.2%. The outer cladding is formed of pure silicon dioxide glass.

18 Claims, 6 Drawing Sheets

(56) References Cited

U.S. PATENT DOCUMENTS

2010/0189400 A1\* 7/2010 Sillard ............... G02B 6/03644
385/127
2018/0372946 A1\* 12/2018 Wang ................ G02B 6/03638

FOREIGN PATENT DOCUMENTS

| CN | 107193079 A | 9/2017 |
| CN | 107678087 A | 2/2018 |
| CN | 110780379 A | 2/2020 |

\* cited by examiner

LOW-DISPERSION SINGLE-MODE OPTICAL FIBER

FIELD OF THE INVENTION

The present disclosure relates generally the field of optical communication, and more particularly to a low-dispersion single-mode fiber.

BACKGROUND OF THE INVENTION

The 5G fronthaul colored solution works in a range from 1271 nm to 1371 nm, but the traditional G.652 single-mode fiber has large dispersion at a waveband ranging from 1351 nm to 1371 nm, which leads to a larger transmission power penalty. It is thus necessary to use an APD high sensitivity detector to realize power compensation. An APD, however costs much more than a PIN detector. Moreover, other fibers, such as dispersion-flattened fibers, non-zero dispersion-shifted single-mode fibers, and low dispersion slope non-zero dispersion-shifted single-mode fibers can be optimized in terms of dispersion thereof mostly in a range from 1450 nm to 1600 nm, which cannot meet requirements of the 5G fronthaul colored solution. Therefore, by preparing a new type of single-mode fiber that is compatible with the existing G.652 fiber and has lower dispersion in a range from 1270 nm to 1380 nm, the cost of 5G fronthaul can be greatly reduced.

SUMMARY OF THE INVENTION

To facilitate description of the present disclosure, some terms used in this text are defined as follows.

Core rod: a preformed member including a core layer and part of a cladding.

Radius: a distance from an outer edge of a layer to the center point of the core layer.

Refractive index profile: reflecting a relationship between a glass refractive index of a fiber or a fiber preformed rod (including the core rod) and a radius thereof.

Contribution amount of fluorine (F): a relative refractive index difference ($\Delta F$) of quartz glass doped with fluorine (F) relative to pure quartz glass, which is used to indicate a doping amount of fluorine (F).

Contribution amount of germanium (Ge): a relative refractive index difference ($\Delta Ge$) of quartz glass doped with germanium (Ge) relative to pure quartz glass, which is used to indicate a doping amount of germanium (Ge).

Contribution amount of phosphorus (P): a relative refractive index difference ($\Delta P$) of quartz glass doped with phosphorus (P) relative to pure quartz glass, which is used to indicate a doping amount of phosphorus (P).

Relative refractive index difference $\Delta_i$:

$$\Delta_i = \left[(n_i^2 - n_0^2)/2n_i^2\right] \times 100\%$$

where $n_i$ is a refractive index of a corresponding part of the fiber and $n_0$ is a refractive index of pure silicon dioxide glass.

Dispersion slope S in a range from 1270 nm to 1380 nm, in which dispersion monotonously increases, is defined as:

$$S = \frac{D_{1380} - D_{1270}}{1380 \text{ nm} - 1270 \text{ nm}}$$

where $D_{1380}$ and $D_{1270}$ respectively represent dispersion at 1380 nm and dispersion at 1270 nm. The dispersion slope is defined in ps/nm/km.

Directed against the above deficiency in the existing technologies, the present disclosure aims to provide a single-mode fiber which has a core layer and claddings with reasonably designed structures, can be prepared in an easily controllable process, is compatible with the existing G.652 fiber, and has low dispersion at a waveband ranging from 1270 nm to 1380 nm.

In order to achieve the above objective, the present disclosure adopts the following technical solutions. The low-dispersion single-mode fiber includes a core layer and claddings. The core layer has a radius R1 in a range from 3 µm to 5 µm and a relative refractive index difference $\Delta 1$ in a range from 0.15% to 0.45%. The claddings include a first depressed cladding, a raised cladding, a second depressed cladding, and an outer cladding from inside to outside. The first depressed cladding has a unilateral width (R2−R1) in a range from 2 µm to 7 µm and a relative refractive index difference $\Delta 2$ in a range from −0.4% to 0.03%. The raised cladding has a unilateral width (R3−R2) in a range from 2 µm to 7 µm and a relative refractive index difference $\Delta 3$ in a range from 0.05% to 0.20%. The second depressed cladding has a unilateral width (R4−R3) in a range from 0 µm to 8 µm and a relative refractive index difference $\Delta 4$ in a range from 0% to −0.2%. The outer cladding is a layer made of pure silicon dioxide glass.

According to the above solution, a preferred range for the radius of the core layer is from 3.5 µm to 4.5 µm.

According to the above solution, a preferred range for the relative refractive index difference $\Delta 1$ of the core layer is from 0.20% to 0.40%.

According to the above solution, the core layer is a silicon dioxide glass layer co-doped with germanium (Ge) and fluorine (F), and has a contribution amount of doped fluorine, i.e., $\Delta F1$, in a range from −0.2% to −0.02%.

According to the above solution, a preferred range for the unilateral width of the first depressed cladding (R2−R1) is from 2.5 µm to 5.5 µm.

According to the above solution, a difference value between the relative refractive index difference of the core layer and the relative refractive index difference of the first depressed cladding, i.e., $\Delta 1$-$\Delta 2$, is in a range from 0.3% to 0.5%.

According to the above solution, a value of annular area integral for the relative refractive index difference of the first depressed cladding, i.e., $\Delta 2 \times (R2^2 - R1^2)$, is in a range from −15%·µm² to −2%·µm².

According to the above solution, the first depressed cladding is a silicon dioxide glass layer co-doped with germanium (Ge) and fluorine (F), and has a contribution amount of doped fluorine, i.e., $\Delta F2$, in a range from −0.45% to −0.04%.

According to the above solution, a value of annular area integral for the relative refractive index difference of the raised cladding, i.e., $\Delta 3 \times (R3^2 - R2^2)$, is in a range from 4%·µm² to 21%·µm².

According to the above solution, the raised cladding is a silicon dioxide glass layer doped with Ge or co-doped with Ge and F, and has a contribution amount of doped fluorine, i.e., $\Delta F3$, in a range from −0.20% to 0%.

According to the above solution, the fiber has an MFD at a wavelength of 1310 nm in a range from 8.5 µm to 9.5 µm.

According to the above solution, the fiber has a cable cutoff wavelength $\lambda_{cc}$ smaller than or equal to 1260 nm.

According to the above solution, a preferred value of the cable cutoff wavelength $\lambda_{cc}$ of the fiber is larger than or equal to 1060 nm.

According to the above solution, the fiber has attenuation smaller than or equal to 0.45 dB at a waveband ranging from 1270 nm to 1380 nm.

According to the above solution, the fiber has dispersion in a range from −12 ps/nm/km to 5 ps/nm/km at a waveband ranging from 1270 nm to 1380 nm.

According to the above solution, the fiber has dispersion in a range from −3.5 ps/nm/km to 3.5 ps/nm/km at a waveband ranging from 1340 nm to 1380 nm.

According to the above solution, the fiber has a dispersion slope smaller than or equal to 50.08 ps/nm²·km at a waveband ranging from 1270 nm to 1380 nm, and a preferred dispersion slope is smaller than or equal to 0.070 ps/nm²·km.

According to the above solution, the fiber has a zero dispersion wavelength in a range from 1300 nm to 1400 nm.

According to the above solution, the fiber has macrobending additional loss (when bent into 100 circles with a diameter of 25 mm) smaller than or equal to 0.05 dB.

According to the above solution, use of the fiber in the present disclosure as a low-dispersion single-mode fiber in a communication system is provided, and the fiber is used for a WDM transmission system at a waveband ranging from 1270 nm to 1380 nm.

The beneficial effects of the present disclosure lie in the following aspects. 1. A low-dispersion single-mode fiber having composition of functionally graded materials and a reasonable structure is provided, and the core layer and the claddings are co-doped with Ge and F, which helps to improve viscosity matching of the fiber and dispersion characteristics of materials. 2. Parameters of the first depressed cladding are reasonably designed to reduce a dispersion slope of the fiber, and parameters of the raised cladding are reasonably designed to reduce the dispersion slope and increase an effective area. 3. The fiber has a relatively large MFD and is compatible with the G.652 fiber; and a relative reflective index difference of the core layer of the fiber is lower than that of the conventional G.655 fiber, and a doping amount of Ge is low, so that the fiber has relatively low attenuation. 4. The fiber of the present disclosure has excellent bending-resistance performance, and is suitable for access networks and miniaturized optical devices; and a manufacturing method of the fiber is simple and convenient, and thus the fiber is suitable for large-scale production.

DETAILED DESCRIPTION OF THE EMBODIMENTS

Figure 3:
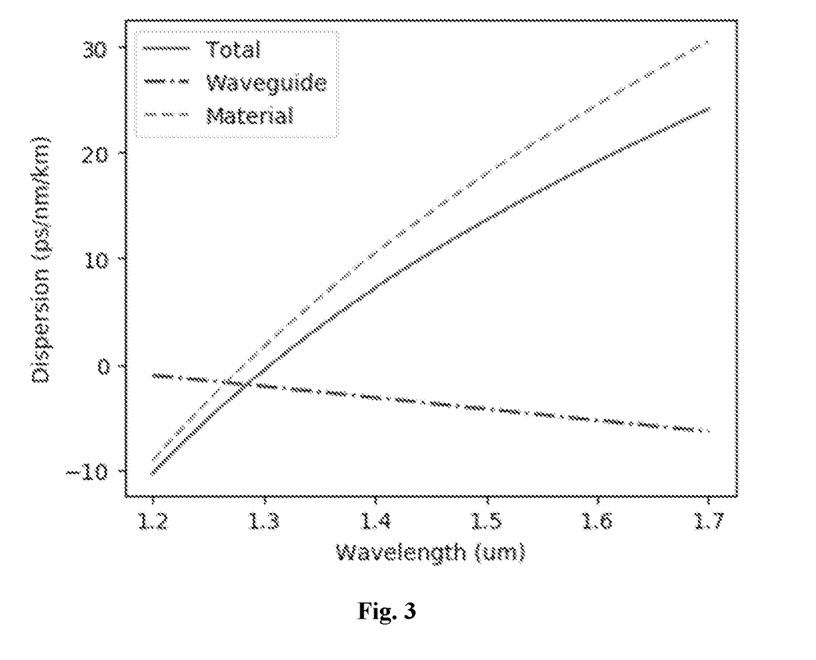
FIG. 3 schematically shows material dispersion, waveguide dispersion, and total dispersion of a fiber.
Figure 4:
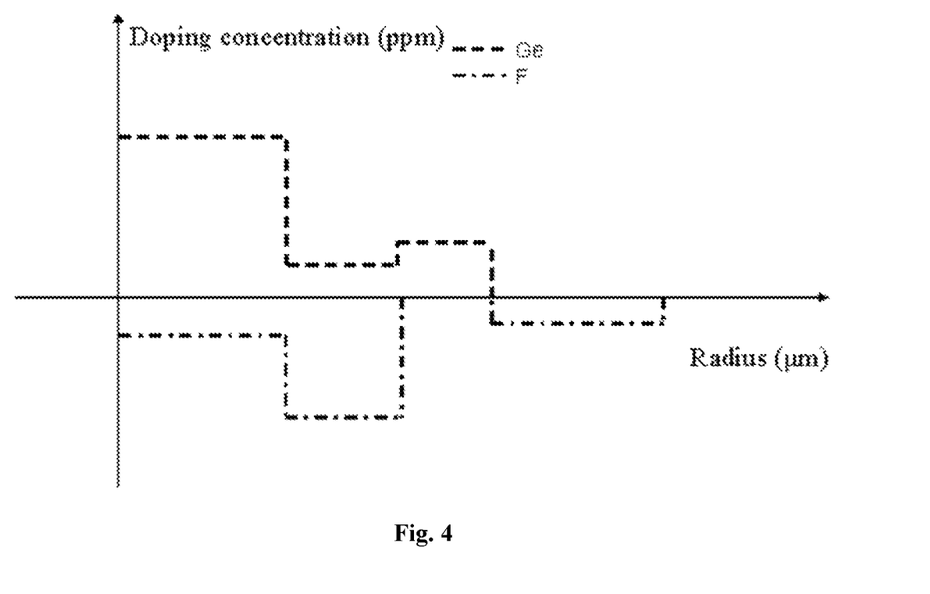
FIG. 4 schematically shows doping in an embodiment of the present disclosure.
Figure 5:
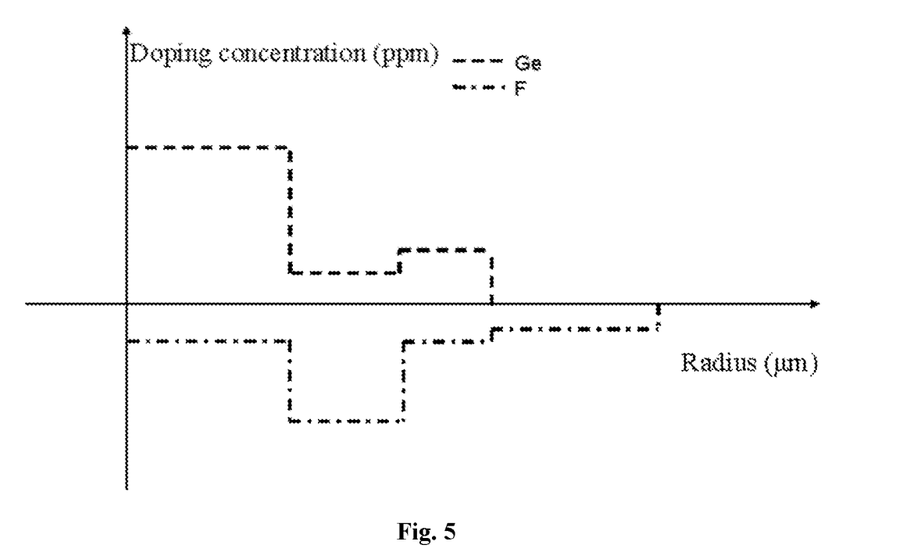
FIG. 5 schematically shows doping in another embodiment of the present disclosure.

Total dispersion of a single-mode fiber is the sum of material dispersion and waveguide dispersion, as shown in the following equation:

$$D(\lambda)=D_{mat}(\lambda)+D_{wg}(\lambda).$$

Broadband dispersion can be realized by adjusting the material dispersion and the waveguide dispersion. Main factors affecting the material dispersion are doping components and doping concentrations thereof. Doping of germanium increases the material dispersion and the dispersion slope; and a low concentration of F has little influence on the dispersion.

In the single-mode fiber, only about 80% of optical power is transmitted in a fiber core, and 20% of the optical power is transmitted in a cladding. When pulses are transmitted in the fiber core and the cladding at the same time, a transmission speed in the fiber core and a transmission speed in the cladding are different due to different refractive index, so that waveguide dispersion is caused. Refractive indexes of the fiber core and the cladding and a profile structure can be adjusted so as to adjust the value and the slope of the waveguide dispersion. The waveguide dispersion is dependent on the mode field distribution between the fiber core and the cladding, that means it dependent on MFD, while the MFD is also dependent on wavelength.

Reasonable design of parameters for a first depressed cladding can reduce the dispersion slope of the fiber. When a width of the first depressed cladding is increased, most energy is limited in a core layer, so that the dispersion slope is reduced; and when the width of the first depressed cladding is further increased, influence of a raised layer is weakened, which leads to increasing of the dispersion slope. In addition, when a relative reflective index difference of the first depressed cladding is reduced, more energy is limited in the core layer, so that the slope of the waveguide dispersion is reduced, thereby reducing the total dispersion slope. However, the above method of reducing the dispersion slope is essentially to change an energy distribution by reducing an effective area, in which case MFD is also reduced.

In order that the fiber is compatible with the conventional G.652 single-mode fiber, it is required that MFD of the fiber should be large enough. By disposing a raised cladding designed with reasonable parameters in the cladding, a transmission speed of the pulses in the cladding can be reduced, so that the transmission speed difference between the fiber core and the cladding is reduced, thereby reducing the dispersion slope. In addition, the raised cladding allows for transmission of part of the energy, which can increase the effective area and increase the MFD. A second depressed cladding outside the raised cladding may restrict transmission of the optical power to an outer cladding, which can enhance a bending-insensitive property of the fiber.

Specific embodiments will be provided below to further describe the present disclosure.

Figure 1:
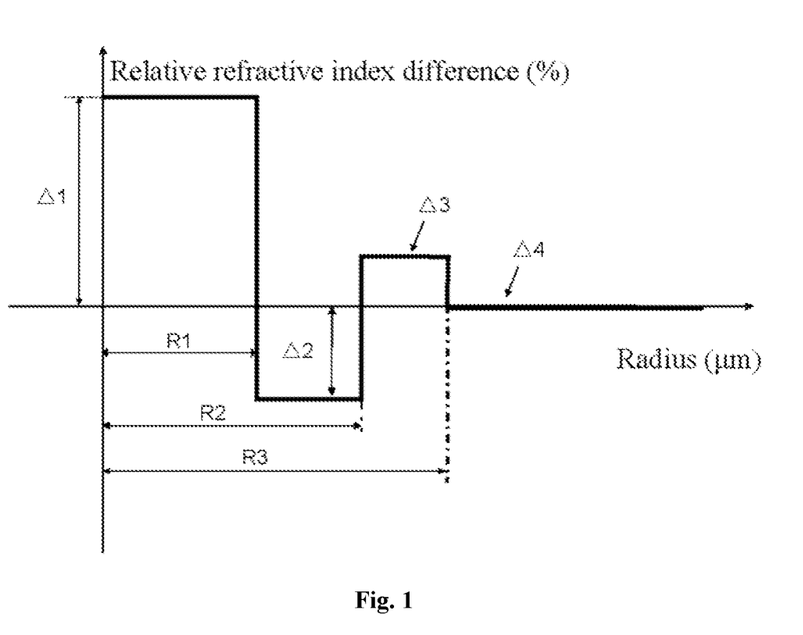
FIG. 1 schematically shows a refractive index profile in an embodiment of the present disclosure.
Figure 2:
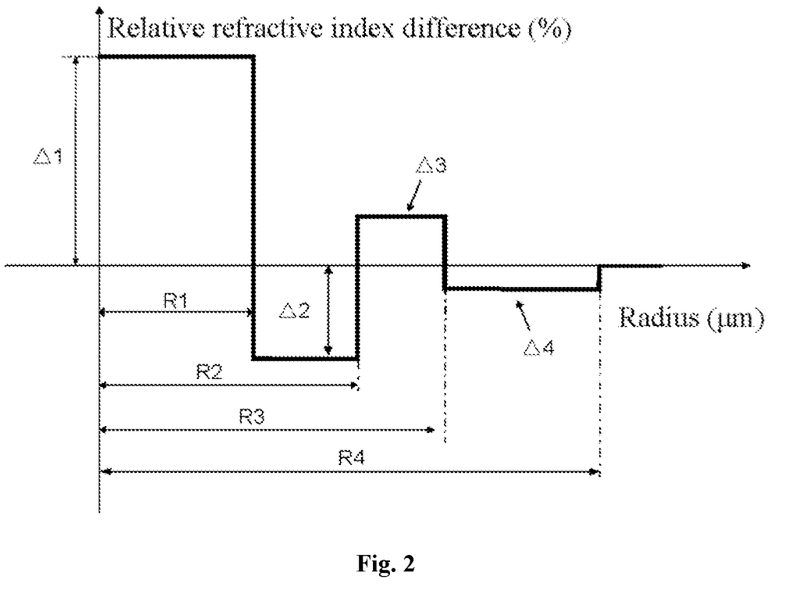
FIG. 2 schematically shows a refractive index profile in another embodiment of the present disclosure.

The fiber of the present disclosure includes a core layer and claddings. The core layer has a radius R1 and a relative refractive index difference Δ1. The claddings include a first depressed cladding, a raised cladding, a second depressed cladding, and an outer cladding from inside to outside. The first depressed cladding has a radius R2 and a relative refractive index difference Δ2. The raised cladding has a radius R3 and a relative refractive index difference Δ3. The second depressed cladding has a radius R4 and a relative refractive index difference Δ4. The outer cladding is a layer made of pure silicon dioxide glass, and has a radius of 62.5 μm.

According to the description of present disclosure, a group of preformed rods were prepared and drawn into fibers, and a double-layer coating was applied to the fibers.

Structural parameters and main performance parameters of the fibers are shown in Table 1.

As shown in Embodiment 1 and Embodiment 3, arranging the second depressed cladding can enhance a bending-resistance property of the fiber, but would slightly increase the dispersion slope. Based on this, the first depressed cladding and the raised cladding may be adjusted to reduce the dispersion slope.

With decreasing of annular area integral for the relative refractive index difference of the first depressed cladding, i.e., $\Delta 2 \times (R2^2 - R1^2)$, the dispersion slope is reduced significantly, as shown in Embodiments 2 to 5. It is required that $\Delta 2 \times (R2^2 - R1^2)$ be at least smaller than $-2\% \cdot \mu m^2$. However, at this time, the MFD is reduced, and the dispersion is reduced. Therefore, it is required that $\Delta 2 \times (R2^2 - R1^2)$ be larger than $-15\% \cdot \mu m^2$ so as to ensure an MFD matching the conventional G.652 single-mode fiber and a reasonable dispersion value.

In actual application of the fiber, there are requirements for the MFD, a dispersion value, and the bending-resistance property. When relatively large $\Delta 2 \times (R2^2 - R1^2)$ and $\Delta 3 \times (R3^2 - R2^2)$ are ensured, influence of the second depressed cladding on respective parameters is far smaller than that of the first depressed cladding and the raised cladding. Therefore, a very deep and wide second depressed cladding may be prepared, so as to enhance the bending-resistance property. In view of the above limiting condition of multiple claddings, in order to reduce the material dispersion and attenuation, a method of reducing doping of germanium in the core layer may be adopted to adjust and optimize parameters of the core layer in a certain range, so as to prepare a broadband low-dispersion single-mode fiber having a relatively small absolute value of dispersion at a waveband ranging from 1270 nm to 1380 nm, a small dispersion slope, a relatively large MFD, as shown in Embodiments 10 and 11.

TABLE 1

Main structural parameters and performance parameters of the fibers

| Fiber Parameters | Embodiment 1 | Embodiment 2 | Embodiment 3 | Embodiment 4 | Embodiment 5 | Embodiment 6 |
|---|---|---|---|---|---|---|
| R1 (um) | 4.01 | 3.97 | 3.98 | 3.98 | 4.01 | 4.03 |
| Δ1 (%) | 0.303 | 0.304 | 0.301 | 0.300 | 0.299 | 0.303 |
| Δ1-Δ2 (%) | 0.400 | 0.347 | 0.411 | 0.440 | 0.479 | 0.426 |
| Δ3-Δ2 (%) | 0.202 | 0.186 | 0.212 | 0.240 | 0.330 | 0.267 |
| Δ4-Δ2 (%) | 0.097 | -0.030 | 0.070 | 0.100 | 0.140 | 0.069 |
| Δ2 × (R2² - R1²) | -3.2 | -2.5 | -3.8 | -4.6 | -6.0 | -5.2 |
| Δ3 × (R3² - R2²) | 5.3 | 8.1 | 5.3 | 5.0 | 7.7 | 7.7 |
| Δ4 × (R4² - R3²) | 0.0 | -5.9 | -2.6 | -2.6 | -2.7 | -4.0 |
| MFD@1310 nm (um) | 8.93 | 9.08 | 8.78 | 8.64 | 8.59 | 8.69 |
| Disp@1270 nm (ps/nm/km) | -7.32 | -6.02 | -6.50 | -6.49 | -7.70 | -6.56 |
| Disp@1380 nm (ps/nm/km) | 0.06 | 2.31 | 1.46 | 1.21 | -0.70 | 0.99 |
| S@1270~1380 (ps/nm²/km) | 0.067 | 0.076 | 0.072 | 0.070 | 0.064 | 0.069 |
| λ0 (um) | 1.371 | 1.347 | 1.358 | 1.361 | 1.393 | 1.364 |
| S0 (ps/nm²/km) | 0.061 | 0.073 | 0.067 | 0.063 | 0.053 | 0.060 |

| Fiber Parameters | Embodiment 7 | Embodiment 8 | Embodiment 9 | Embodiment 10 | Embodiment 11 | Embodiment 12 |
|---|---|---|---|---|---|---|
| R1 (um) | 4.02 | 4.01 | 3.84 | 4.41 | 4.41 | 4.41 |
| Δ1 (%) | 0.300 | 0.304 | 0.337 | 0.263 | 0.213 | 0.263 |
| Δ1-Δ2 (%) | 0.423 | 0.427 | 0.400 | 0.450 | 0.450 | 0.450 |
| Δ3-Δ2 (%) | 0.246 | 0.225 | 0.221 | 0.297 | 0.327 | 0.327 |
| Δ4-Δ2 (%) | 0.083 | 0.083 | 0.013 | 0.112 | 0.077 | 0.077 |
| Δ2 × (R2² - R1²) | -5.2 | -5.2 | -2.5 | -9.7 | -12.2 | -0.6 |
| Δ3 × (R3² - R2²) | 8.9 | 10.8 | 8.3 | 8.4 | 8.6 | 16.4 |
| Δ4 × (R4² - R3²) | -3.1 | -3.4 | -3.5 | -6.1 | -30.5 | -22.1 |
| MFD@1310 nm (um) | 8.70 | 8.68 | 8.67 | 8.90 | 8.99 | 9.03 |
| Disp@1270 nm (ps/nm/km) | -6.82 | -6.87 | -7.40 | -3.90 | -4.47 | -5.37 |
| Disp@1380 nm (ps/nm/km) | 0.37 | 0.02 | 0.67 | 3.43 | 2.54 | 0.99 |
| S@1270~1380 (ps/nm²/km) | 0.065 | 0.063 | 0.073 | 0.067 | 0.064 | 0.058 |
| λ0 (um) | 1.374 | 1.380 | 1.370 | 1.323 | 1.335 | 1.359 |
| S0 (ps/nm²/km) | 0.057 | 0.052 | 0.068 | 0.064 | 0.061 | 0.051 |

Figure 6:
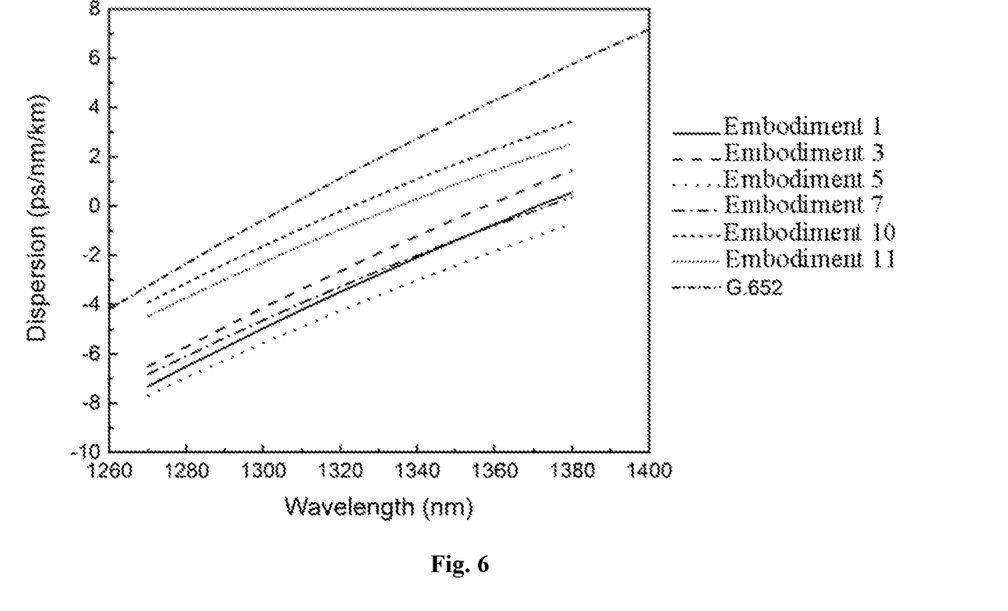
FIG. 6 shows a dispersion-wavelength graph for some embodiments of the present disclosure.

With increasing of annular area integral for the relative refractive index difference of the raised cladding, i.e., $\Delta 3 \times (R3^2 - R2^2)$, the dispersion slope is decreased, and the dispersion is reduced, as shown in Embodiments 6 to 8. For another example, in Embodiment 12, when $\Delta 3 \times (R3^2 - R2^2)$ is very large, the dispersion slope is very small, but the dispersion is further reduced. Therefore, in order to ensure a small enough dispersion slope and a proper dispersion value, it is required that $\Delta 3 \times (R3^2 - R2^2)$ be in a range from $4\% \cdot \mu m^2$ to $21\% \cdot \mu m^2$.

Embodiments 2 and 9 show that increasing of the annular area integral for the relative refractive index difference of the raised cladding, i.e., $\Delta 3 \times (R3^2 - R2^2)$ only is not sufficient enough to improve the dispersion slope.

What is claimed is:

1. A low-dispersion single-mode fiber, comprising:
core layer and claddings, wherein
the core layer has a radius R1 in a range from 3 μm to 3.98 μm and a relative refractive index difference Δ1 in a range from 0.15% to 0.45%, and
the claddings comprise a first depressed cladding, a raised cladding, a second depressed cladding, and an outer cladding from inside to outside, wherein
the first depressed cladding has a unilateral width (R2-R1) in a range from 2 μm to 7 μm and a relative refractive index difference Δ2 in a range from -0.4% to 0.03%;

the raised cladding has a unilateral width (R3−R2) in a range from 2 μm to 7 μm and a relative refractive index difference Δ3 in a range from 0.05% to 0.20%;

the second depressed cladding has a unilateral width (R4−R3) in a range from 0 μm to 8 μm and a relative refractive index difference Δ4 in a range from 0% to −0.2%; and the outer cladding is a layer made of pure silicon dioxide glass, wherein the core layer is a silicon dioxide glass layer co-doped with germanium Ge and fluorine F, and has a contribution amount of doped F, wherein ΔF1 is in a range from −0.2% to −0.02%.

2. The low-dispersion single-mode fiber according to claim 1, wherein the radius of the core layer is in a range from 3.5 μm to 3.98 μm.

3. The low-dispersion single-mode fiber according to claim 1, wherein the relative refractive index difference Δ1 of the core layer is in a range from 0.20% to 0.40%.

4. The low-dispersion single-mode fiber according to claim 1, wherein the unilateral width of the first depressed cladding (R2−R1) is in a range from 2.5 μm to 5.5 μm.

5. The low-dispersion single-mode fiber according to claim 1, wherein a difference value between the relative refractive index difference of the core layer and the relative refractive index difference of the first depressed cladding, wherein Δ1-Δ2 is in a range from 0.3% to 0.5%.

6. The low-dispersion single-mode fiber according to claim 1, wherein a value of annular area integral for the relative refractive index difference of the first depressed cladding, wherein Δ2×(R2²−R1²) is in a range from −15%·μm² to −2%·μm².

7. The low-dispersion single-mode fiber according to claim 6, wherein the first depressed cladding is a silicon dioxide glass layer co-doped with Ge and F, and has a contribution amount of doped F, wherein ΔF2 is in a range from −0.45% to −0.04%.

8. The low-dispersion single-mode fiber according to claim 1, wherein a value of annular area integral for the relative refractive index difference of the raised cladding, wherein Δ3×(R3²−R2²) is in a range from 4%·μm² to 21%·μm².

9. The low-dispersion single-mode fiber according to claim 8, wherein the raised cladding is a silicon dioxide glass layer doped with Ge or co-doped with Ge and F, and has a contribution amount of doped F, wherein ΔF3 is in a range from −0.20% to 0%.

10. The low-dispersion single-mode fiber according to claim 1, wherein the fiber has an MFD at a wavelength of 1310 nm in a range from 8.5 μm to 9.5 μm.

11. The low-dispersion single-mode fiber according to claim 1, wherein the fiber has a cable cutoff wavelength $\lambda_{cc}$ smaller than or equal to 1260 nm.

12. The low-dispersion single-mode fiber according to claim 1, wherein the fiber has attenuation smaller than or equal to 0.45 dB at a waveband ranging from 1270 nm to 1380 nm.

13. The low-dispersion single-mode fiber according to claim 1, wherein the fiber has dispersion in a range from −12 ps/nm/km to 5 ps/nm/km at a waveband ranging from 1270 nm to 1380 nm.

14. The low-dispersion single-mode fiber according to claim 1, wherein the fiber has dispersion in a range from −3.5 ps/nm/km to 3.5 ps/nm/km at a waveband ranging from 1340 nm to 1380 nm.

15. The low-dispersion single-mode fiber according to claim 1, wherein the fiber has a dispersion slope smaller than or equal to 0.08 ps/nm²·km at a waveband ranging from 1270 nm to 1380 nm.

16. The low-dispersion single-mode fiber according to claim 1, wherein the fiber has a zero dispersion wavelength in a range from 1300 nm to 1400 nm.

17. Use of the fiber according to claim 1 as a low-dispersion single-mode fiber in a communication system, wherein the fiber is used for a WDM transmission system at a waveband ranging from 1270 nm to 1380 nm.

18. A low-dispersion single-mode fiber, comprising:
core layer and claddings, wherein
the core layer has a radius R1 in a range from 3 μm to 5 μm and a relative refractive index difference Δ1 in a range from 0.15% to 0.45%, and
the claddings comprise a first depressed cladding, a raised cladding, a second depressed cladding, and an outer cladding from inside to outside, wherein
the first depressed cladding has a unilateral width (R2−R1) in a range from 2 μm to 7 μm and a relative refractive index difference Δ2 in a range from −0.4% to 0.03%;
the raised cladding has a unilateral width (R3−R2) in a range from 2 μm to 7 μm and a relative refractive index difference Δ3 in a range from 0.05% to 0.20%;
the second depressed cladding has a unilateral width (R4−R3) in a range from 0 μm to 8 μm and a relative refractive index difference Δ4 in a range from 0% to −0.2%; and
the outer cladding is a layer made of pure silicon dioxide glass,
wherein the core layer is a silicon dioxide glass layer co-doped with germanium Ge and fluorine F, and has a contribution amount of doped F, wherein ΔF1 is in a range from −0.2% to −0.02%.

* * * * *